United States Patent
Jones et al.

[11] Patent Number: 6,103,857
[45] Date of Patent: Aug. 15, 2000

[54] POLY(ETHYLENE TEREPHTHALATE) (PET) COPOLYMERS CONTAINING BOTH 1,4-CYCLOHEXANEDIMETHANOL AND ISOPHTHALIC ACID MOIETIES

[75] Inventors: Allan Scott Jones, Limestone; Timothy Edward Long, Blountville; Sara Stanley Wells, Kingsport, all of Tenn.

[73] Assignee: Eastman Chemical Company, Kingsport, Tenn.

[21] Appl. No.: 09/096,278

[22] Filed: Jun. 11, 1998

Related U.S. Application Data

[60] Provisional application No. 60/050,230, Jun. 19, 1997.

[51] Int. Cl.⁷ .................................................... C08G 63/02
[52] U.S. Cl. ........................................... 528/272; 528/271
[58] Field of Search ...................................... 528/196, 198

[56] References Cited

U.S. PATENT DOCUMENTS

| | | | |
|---|---|---|---|
| 4,474,918 | 10/1984 | Seymour et al. | 524/324 |
| 4,578,437 | 3/1986 | Light et al. | 525/444 |

FOREIGN PATENT DOCUMENTS

| | | |
|---|---|---|
| 0 517 171A2 | 12/1992 | European Pat. Off. |
| WO 94/01482 | 1/1994 | WIPO |
| WO 96/30428 | 10/1996 | WIPO |
| WO 98/02479 A1 | 1/1998 | WIPO |

OTHER PUBLICATIONS

Database WPI, Week 9710, Derwent Publications Ltd., London, GB; AN 97–106325; XP002079142 & KR 9 503 803 A (Tong Yang Nylon Co. Ltd.), Apr. 20, 1995.

*Primary Examiner*—Terressa M. Boykin
*Attorney, Agent, or Firm*—Karen A. Harding; Harry J. Gwinnell

[57] ABSTRACT

This invention relates to PET copolymer composition that have both 1,4-cyclohexanedimethal (CHDM) and isophthalic acid moieties copolymerized. These compositions have better oxygen and carbon dioxide barrier properties than either PET homopolymer or CHDM-modified PET copolymers. These copolymer compositions are useful for packaging applications (such as carbonated soft drink bottles) requiring barrier properties to oxygen and carbon dioxide at least as good or better than PET homopolymer.

15 Claims, No Drawings

POLY(ETHYLENE TEREPHTHALATE) (PET) COPOLYMERS CONTAINING BOTH 1,4-CYCLOHEXANEDIMETHANOL AND ISOPHTHALIC ACID MOIETIES

CROSS REFERENCES TO RELATED APPLICATIONS

This application claims the benefit of U.S. Provisional Application Serial No. 60/050,230 filed Jun. 19, 1997.

FIELD OF THE INVENTION

This invention relates to polyester compositions and specifically to poly(ethylene terephthalate) (PET) copolymer compositions containing both 1,4-cyclohexanedimethanol (CHDM) and isophthalic acid (or dimethyl isophthalate). This polymer composition is useful in many applications; particularly beverage packaging applications that require improved carbon dioxide or oxygen barrier.

BACKGROUND OF THE INVENTION

It is well known in the art that PET is useful for many packaging applications. It is also very well known and practiced that PET or modified PET is the polymer of choice for making beverage and food containers, particularly carbonated beverage containers. Furthermore, it is known that PET can be modified, on a commercial scale with either CHDM or isophthalic acid (or dimethyl isophthalate).

While each comonomer has its benefits, both suffer from detriments when used alone. CHDM improves the ease of processing of the resin, but unfortunately decreases the barrier properties of the resultant container. Isophthalic acid increases the barrier of the PET, but unfortunately decreases the processing window in which acceptable containers can be formed. Accordingly, there remains a need in the art for a resin which displays improved barrier without sacrificing processability.

WO 98/02479 discloses copolyesters containing repeat units from terephthalic acid, ethylene glycol, at least 5 mole % isophthalic acid and optionally 2,6-naphthalene dicarboxylic acid. However, additional repeat units, such as CHDM are not disclosed.

SUMMARY OF THE INVENTION

The present invention relates to polyesters displaying improved barrier properties to carbon dioxide and oxygen and good processability. More specifically the present invention relates to polyesters comprising CHDM and isophthalic acid as modifying monomers. It should be understood that the use of the term isophthalic acid (or terephthalic acid) also includes simple ester derivatives such as dimethyl isophthalate or dimethyl terephthalate. The polyesters of the present invention display novel combinations of crystallization rate, barrier and absorption properties.

DETAILED DESCRIPTION OF THE INVENTION

The polymers of the present invention comprise terephthalic acid residues, CHDM residues and isophthalic acid residues. The polymers contain repeat units from the dicarboxylic acids (isophthalic and terephthalic acids) and from the glycols (ethylene glycol and CHDM). More specifically, the compositions of the present invention comprise a dicarboxylic acid component comprising isophthalic acid and terephthalic acid and a glycol component comprising ethylene glycol and CHDM wherein the molar ratio of isophthalic acid to CHDM is about 1:1 to about 20:1. Also disclosed are formed articles such as films and containers which display an $O_2$ permeability ratio over PET homopolymer of at least about 1.05.

The dicarboxylic acid component is comprised of at least 80 mole percent terephthalic acid and preferably at least 85 mole percent terephthalic acid and more preferably 90 mole percent terephthalic acid. The remaining part of the acid component is isophthalic acid. The diol (or glycol) component is comprised of at least 90 mole percent ethylene glycol and preferably at least 95 mole percent ethylene glycol. The remaining part of the diol component is CHDM.

The ratio of isophthalic acid to CHDM is critical for our application. The ratio of isophthalic acid to CHDM (on a mole basis) is about 1:1 to about 20:1, preferably about 1.5:1 to about 16:1 and more preferably about 2:1 to about 10:1.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids include phthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and the like.

In addition, the glycol component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, mixtures thereof and the like. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Also, although not required, additives normally used in polyesters may be used if desired. Such additives include, but are not limited to colorants, pigments, carbon black, glass fibers, fillers, impact modifiers, antioxidants, stabilizers, flame retardants, reheat aids, acetaldehyde reducing compounds, crystallization aids and the like.

The polyesters of the present invention are formed via conventional polyesterification. The three polymerization stages are hereinafter referred to as the esterification stage, the prepolymer stage, and the polycondensation stage. The basic conditions which define these three stages throughout the present application are set out below for convenience and clarity.

In the first stage of the melt-phase process, a mixture of polyester monomer (diglycol esters of dicarboxylic acids) and oligomers are produced by conventional, well-known processes. The ester exchange or esterification reaction is conducted at a temperature between about 220° C. to about 250° C. and a pressure of about 0 to about 20 psig in the presence of suitable ester exchange catalysts such as lithium, magnesium, calcium, manganese, cobalt and zinc, or esterification catalysts such as hydrogen or titanium suitable forms of which are generally known in the art. The catalysts can be used alone or in combination. Preferably the total amount of catalyst is less than about 100 ppm on an elemental basis. Suitable colorants may also be added at this point to control the final color of the polyester. The reaction is conducted for about 1 to about 4 hours. It should be understood that generally the lower the reaction temperature, the longer the reaction will have to be conducted.

Generally at the end of the esterification, a polycondensation catalyst is added. Suitable polycondensation catalysts include salts of titanium, gallium, germanium, tin, antimony and lead, preferably antimony or germanium or a mixture thereof. Preferably the amount of catalyst added is between about 90 and 150 ppm when germanium or antimony is used. Suitable forms such as, but not limited to antimony oxide are well known in the art. The prepolymer reaction is conducted at a temperature less than about 280° C., and preferably between about 240° C. and 280° C. at a pressure sufficient to aid in removing undesirable reaction products such as ethylene glycol. The monomer and oligomer mixture is typically produced continuously in a series of one or more reactors operating at elevated temperature and pressures at one atmosphere or greater. Alternately, the monomer and oligomer mixture could be produced in one or more batch reactors.

Next, the mixture of polyester monomer and oligomers undergoes melt-phase polycondensation to produce a low molecular weight precursor polymer. The precursor is produced in a series of one or more reactors operating at elevated temperatures. To facilitate removal of excess glycols, water, alcohols, aldehydes, and other reaction products, the polycondensation reactors are run under a vacuum or purged with an inert gas. Inert gas is any gas which does not cause unwanted reaction or product characteristics. Suitable gases include, but are not limited to $CO_2$, argon, helium and nitrogen.

Temperatures for this step are generally between about 240° C. to about 280° C. and a pressure between about 0 and 2 mm Hg. Once the desired inherent viscosity is reached, the polymer is pelletized. Precursor I.V. is generally below about 0.7 to maintain good color. The target I.V. is generally selected to balance good color and minimize the amount of solid stating which is required. Inherent viscosity (I.V.) was measured at 25° C. using 0.50 grams of polymer per 100 ml of a solvent consisting of 60% by weight phenol and 40% by weight tetrachloroethane.

The materials and testing procedures for the results shown herein are as follows:

Inherent Viscosity (Ih.V.): Determined at 25° C. with a 0.50 gram sample of the polymer in 100 mL of 60/40 by weight solution of phenol/tetrachloroethane.

Polymer Composition: Determined by hydrolysis GC and $^1$H-NMR.

Film Extrusion: Melt cast film was produced using a laboratory scale film line which consisted of a 1 inch Killion extruder having a single flight screw, a 6 inch wide die, and a 20 mil die opening. Similar conditions were used for all compositions. The heater zones and die were set between 260 and 270° C. with a screw RPM of about 85 which produced amperage readings between 4 and 9 and a measured melt temperature between 270 and 275° C. The nominal 20 mil film passed over a chill roll (130–150° C.) and was collected on a tubular, cardboard roll. Prior to processing, the ground polymer was dried for about 6 hours at 140° C. in a dehumidified air dryer.

T. M. Long Film Stretching: All the materials were biaxially oriented using a TM Long Film Stretcher. The materials were all stretched at 20° above the $T_g$ (second scan $T_g$). The materials were biaxially oriented 300% in each direction, a 4×4 stretch, simultaneously at a rate of 14 in/sec or 270%/sec. The samples were held 2 minutes at temperature prior to stretching. The samples were stored in a controlled environment, 23° C. and 50% RH, prior to stretching, and as well, were equilibrated a minimum of 14 days after extruding before stretching. The $T_g$'s were measured within 24 hours of orienting.

Permeability Measurements: Oxygen permeability measurements were conducted using a Modem Controls (MOCON) Oxtran 10/50A permeability tester. Measurements were made at 23.0±0.1° C. Test gases were passed through water bubblers, resulting in about 75% RH. Testing was done in accordance with ASTM D 3985.

Carbon dioxide permeability measurements were using a MOCON Permatran C-IV permeability tester. Tests were run at 23.0±0.2° C. with dry gases (0% RH).

Sample thickness is required for determining permeability. In this work thickness was measured using a micrometer with 0.05 mil precision. The mean of at least five measurements around a test sample was used.

It is known that physical aging of PET films leads to an appreciable decrease in permeability. This occurs because the diffusion of gas molecules in glassy polymers is strongly dependent on the free volume present, which diminishes with age for films below $T_g$. Immediately after being cooled below the glass transition, the physical aging rate is fairly rapid, but after roughly 10 days the rate becomes very slow. Likewise, the observed decrease in permeability occurs largely during the initial 10 days after the most recent exposure above $T_g$. $O_2$ permeability reductions of 20% for extruded films and 10% for oriented films during the first 10 days have been previously observed. Beyond the initial 10 days further reductions in permeability were on the order of a few percent during the subsequent months. Since small compositional differences in permeability are of interest in this work, all samples were aged for at least 14 days after extrusion or biaxial orientation before being tested for permeability to avoid confounding compositional effects with physical aging effects.

For oriented films at least three permeability test specimens were sampled and tested for each composition. In the case of $O_2$ duplicate test runs were conducted on each test specimen, while for $CO_2$ triplicate runs were conducted to reduce test method uncertainty. For extruded films typically only one sample was tested due to the long equilibration time (only $O_2$ permeability was measured for extruded films, not $CO_2$ permeability).

For oriented films the outer 1½" to 2" were discarded along with the 4"×4" corner corresponding to the corner of the T.M. Long apparatus with stationary clamps. This corner was found to have statistically higher permeability plus lower mechanical properties and crystallinity than the remainder of the film. A locally higher temperature in this region of the T.M. Long apparatus is a possible cause of these effects. To minimize sample-to-sample variability, this corner was excluded from the sampling. Test samples were randomly drawn from the remaining portions of several biaxially oriented films.

EXAMPLES

The following examples are meant to illustrate the present invention. All parts and percentages in the examples are on a molar basis unless otherwise stated.

Example 1
Preparation of poly(ethylene terephthalate) (PET) homopolymer

PET homopolymer was prepared by the following procedure. Dimethyl terephthalate (0.75 moles, 145.5 g), ethylene glycol (1.5 moles, 93 g) and catalyst metals were placed in a 0.5 L polymerization reactor under a nitrogen atmosphere. The mixture was heated with stirring at 200° C. for 1 hour and then 210° C. for 2 hours. The temperature was increased to 280° C., the nitrogen flow was stopped and vacuum was applied. The polymer was stirred under vacuum (0.4–0.55 mm Hg) for 1 hour and 25 minutes. The polymer was allowed to cool and ground. The I.V. was 0.702 dL/g. Several batches of similar I.V. were blended together and solid-state polymerized (as described in more detail below) for 30 minutes at 215° C. to achieve an Ih.V. of 0.73 dL/g. The ground solid-stated polymer was converted to extruded and then biaxially oriented film as described previously. Table 1 lists the permeability of the biaxially oriented films to both oxygen and carbon dioxide.

Example 2
Solid State Polymerization

Several batches with inherent viscosities within a 0.05–0.08 dL/gram range were combined and dry blended. Subsequent film extrusion processing required a minimum of 600 grams of total copolymer. The 600 gram sample was placed in a conventional glass solid stating unit, and approximately 4.0 SCFH nitrogen gas was purged through the static bed. The selection of the solid stating temperature and corresponding solvent for temperature control was based on the melting point of the copolymer. It was desirable to maintain a solid stating temperature at least 25° C. below the melting point of the copolymer to avoid pellet agglomeration. Consequently, either diethyl succinate (BP 215° C.) or ethylene glycol (BP 197° C.) were typically employed. In a previous smaller scale experiment (20 grams), samples were taken with time for each copolymer composition to generate a time versus inherent viscosity profile. This profile was used to define the solid stating time for each composition at the 600 gram scale. The I.V. specification was 0.68–0.74 dL/gram. The polymer grind was used directly in subsequent film extrusion processing.

Example 3
Evaluation of Eastapak PET 9921 (PET copolymer with 3.5% copolymerized CHDM)

Eastapak PET 9921 pellets (Ih.V=0.76 dL/g) were extruded into film and biaxially oriented as described previously. Table 1 lists the permeability of the biaxially oriented films to both oxygen and carbon dioxide.

Example 4
Preparation of PET with 1.7% CHDM and 1.5% isophthalic acid

PET copolymerized with 1.7% CHDM and 1.5% isophthalic acid was prepared by the following procedure. Dimethyl terephthalate (0.69 moles, 133.8 g), ethylene glycol (1.39 moles, 86.1 g), dimethyl isophthalate (0.0105 moles, 2.04 g), CHDM (0.011 moles, 1.60 g) and catalyst metals were placed in a 0.5 L polymerization reactor under a nitrogen atmosphere. The mixture was heated with stirring at 200° C. for 1 hour and then 210° C. for 2 hours. The temperature was increased to 280° C., the nitrogen flow was stopped and vacuum was applied. The polymer was stirred under vacuum (0.4–0.55 mm Hg) for 1 hour and 25 minutes. The polymer was allowed to cool and ground. The I.V. was 0.613 dL/g. Several batches of similar I.V. were blended together and solid-state polymerized (as described in Example 1) for 60 minutes at 215° C. to achieve an I.V. of 0.736 dL/g. The ground solid-stated polymer was converted to extruded and then biaxially oriented film as described previously. Table 1 lists the permeability of the biaxially oriented films to both oxygen and carbon dioxide.

Example 5
Preparation of PET with 1.7% CHDM and 2.9% isophthalic acid

PET copolymerized with 1.7% CHDM and 2.9% isophthalic acid was prepared by the following procedure. Dimethyl terephthalate (0.68 moles, 131.7 g), ethylene glycol (1.39 moles, 86.1 g), dimethyl isophthalate (0.021 moles, 4.07 g), CHDM (0.011 moles, 1.60 g) and catalyst metals were placed in a 0.5 L polymerization reactor under a nitrogen atmosphere. The mixture was heated with stirring at 200° C. for 1 hour and then 210° C. for 2 hours. The temperature was increased to 280° C., the nitrogen flow was stopped and vacuum was applied. The polymer was stirred under vacuum (0.4–0.55 mm Hg) for 1 hour and 25 minutes. The polymer was allowed to cool and ground. The I.V. was 0.749 dL/g. Several batches of similar I.V. were blended together and converted to extruded and then biaxially oriented film as described previously. Table 1 lists the permeability of the biaxially oriented films to both oxygen and carbon dioxide.

Example 6
Preparation of PET with 6.4% CHDM and 5.9% isophthalic acid

PET copolymerized with 6.4% CHDM and 5.9% isophthalic acid was prepared by the following procedure. Dimethyl terephthalate (0.66 moles, 126.3 g), ethylene glycol (1.39 moles, 86.1 g), dimethyl isophthalate (0.042 moles, 8.15 g), CHDM (0.045 moles, 6.48 g) and catalyst metals were placed in a 0.5 L polymerization reactor under a nitrogen atmosphere. The mixture was heated with stirring at 200° C. for 1 hour and then 210° C. for 2 hours. The temperature was increased to 280° C., the nitrogen flow was stopped and vacuum was applied. The polymer was stirred under vacuum (0.4–0.55 mm Hg) for 1 hour and 25 minutes. The polymer was allowed to cool and ground. The I.V. was 0.698 dL/g. Several batches of similar I.V. were blended together and solid-state polymerized (as described in Example 1) for 51 minutes at 200° C. to achieve an I.V. of 0.766 dL/g. The ground solid-stated polymer was converted to extruded and then biaxially oriented film as described previously. Table 1 lists the permeability of the biaxially oriented films to both oxygen and carbon dioxide.

Example 7
Preparation of PET with 3.5% CHDM and 7.6% isophthalic acid

PET copolymerized with 3.5% CHDM and 7.6% isophthalic acid was prepared by the following procedure. Dimethyl terephthalate (1.196 moles, 232.0 g), ethylene glycol (2.554 moles, 158.3 g), dimethyl isophthalate (0.104 moles, 20.2 g), CHDM (0.045 moles, 6.6 g) and catalyst metals were placed in a 1.0 L polymerization reactor under a nitrogen atmosphere. The mixture was heated with stirring at 190° C. for 1 hour and then 210° C. for 2 hours. The temperature was increased to 280° C., the nitrogen flow was stopped and vacuum was applied. The polymer was stirred under vacuum (0.4–0.55 mm Hg) for 1 hour and 5 minutes. The polymer was allowed to cool and ground. The I.V. was 0.636 dL/g. Several batches of similar I.V. were blended together and solid-state polymerized (as described in Example 1) for 2 hours at 197° C. to achieve an I.V. of 0.737 dL/g. The ground solid-stated polymer was converted to extruded and then biaxially oriented film as described previously. Table 1 lists the permeability of the biaxially oriented films to both oxygen and carbon dioxide.

TABLE 1

| Ex # | % I | % CHDM | I/CHDM | $CO_2{}^a$ | $XPETCO_2{}^b$ | $O2^c$ | $XPETO_2{}^d$ |
|---|---|---|---|---|---|---|---|
| 1 | 0 | 0 | 0 | 30.13 | 1.0 | 4.54 | 1 |
| 2 | 0 | 3.5 | 0 | 33.49 | 0.9 | 5.13 | 0.89 |
| 3 | 1.5 | 1.7 | 0.88 | 31.49 | 0.96 | 4.73 | 0.96 |
| 4 | 2.9 | 1.7 | 1.71 | 25.53 | 1.06 | 4.62 | 0.98 |
| 5 | 5.9 | 6.4 | 0.92 | 30.55 | 0.99 | 4.93 | 0.92 |
| 6 | 7.6 | 3.5 | 2.17 | 28.7 | 1.05 | 4.2 | 1.08 |

$^a CO_2$ permeability. cc*mil/100 in$^2$*24 hrs.*atm.
$^b$ratio of permeability of sample over permeability of PET homopolymer (Ex. 1).
$^c O_2$ permeability. cc*mil/100 in$^2$*24 hrs.*atm.
$^d$ratio of permeability of sample over permeability of PET homopolymer (Ex. 1).

It can be clearly seen (Example 2) that when the only modifying comonomer is CHDM, the permeability of the polymer is higher (and the barrier lower) than that of PET homopolymer. By adding an amount of isophthalic acid within the ranges of the present invention (Examples 4 and 6), the permeability of the polymer is lowered (and hence the barrier to oxygen and carbon dioxide is raised). Examples 3 and 5 clearly show that the ratio of isophthalic acid to CHDM must be greater than about 1:1 to display the desired improvement of the present invention.

What is claimed is:

1. A mixture for producing a polyester comprising:
   (i) a dicarboxylic acid component comprising isophthalic acid and terephthalic acid, and
   (ii) a glycol component comprising ethylene glycol and 1,4-cyclohexanedimethanol (CHDM), wherein the mixture has a molar ratio of isophthalic acid to CHDM of about 1:1 to about 20:1.

2. The mixture of claim 1, wherein the molar ratio is about 1.5:1 to about 16:1.

3. The mixture of claim 1, wherein the molar ratio is about 2:1 to about 10:1.

4. The mixture of claim 1, wherein component (i) comprises at least about 80 and less than 100 mole percent terephthalic acid.

5. The mixture of claim 1, wherein component (i) comprises at least about 85 and less than 100 mole percent terephthalic acid.

6. The mixture of claim 1, wherein component (i) comprises at least about 90 and less than 100 mole percent terephthalic acid.

7. The mixture of claim 1, wherein component (ii) comprises at least about 90 and less than 100 mole percent ethylene glycol.

8. The mixture of claim 1, wherein component (ii) comprises at least about 95 and less than 100 mole percent ethylene glycol.

9. A process for producing a polyester comprising:
   (a) providing the mixture of claim 1, and
   (b) polymerizing the mixture, thereby forming a polyester.

10. The process of claim 9, wherein step (b) further comprises:
   (i) esterifying the mixture the mixture of step (a) thereby forming a second mixture comprising polyester monomers and oligomers, and
   (ii) polycondensing the second mixture to produce the polyester.

11. A polyester produced from the process of claim 9.

12. A container formed from the polyester of claim 11.

13. A film formed from the polyester of claim 11.

14. The container of claim 12 having an $O_2$ permeability of from about 4.2 to 4.62 cc.mil/100 in$^2$.24 hrs.atm.

15. The film of claim 13 having an $O_2$ permeability of from about 4.2 to 4.62 cc.mil/100 in$^2$.24 hrs.atm.

* * * * *